United States Patent [19]

Beck et al.

[11] 4,252,232
[45] Feb. 24, 1981

[54] CONVEYOR SYSTEM

[75] Inventors: Ludwig Beck, Oakland; Huibertus A. Beekes, Saratoga; Rodger E. Cole, Tracy, all of Calif.

[73] Assignee: Kaiser Aluminum & Chemical Corporation, Oakland, Calif.

[21] Appl. No.: 110,287

[22] Filed: Jan. 7, 1980

Related U.S. Application Data

[63] Continuation of Ser. No. 895,174, Apr. 10, 1978, abandoned.

[51] Int. Cl.³ .................... B65G 47/12; B65G 37/00; B65G 17/46
[52] U.S. Cl. ................ 198/443; 198/580; 198/689; 198/493; 198/597
[58] Field of Search ............. 198/398, 580, 689, 443, 198/449, 495, 835, 493, 450, 397, 396, 597, 367

[56] References Cited
U.S. PATENT DOCUMENTS
4,146,467   3/1979   Sauer et al. .................. 198/398

Primary Examiner—Joseph E. Valenza
Assistant Examiner—B. Bond
Attorney, Agent, or Firm—Paul E. Calrow; John S. Rhoades

[57] ABSTRACT

An article handling system for cans and the like, wherein improved means are employed for selectively isolating individual cans from a substantially continuously recirculating mass or plurality of cans and for, therafter, transferring the isolated cans in single file fashion away from said recirculating mass of cans to a discharge station located somewhat remote from the recirculating mass of cans in such a fashion as to avoid adverse interference with the normal movements of the recirculating mass of cans. The single file movement of the isolated cans is then continued as the isolated cans are individually transferred from the discharge station to a further location.

22 Claims, 4 Drawing Figures

CONVEYOR SYSTEM

This is a continuation of application Ser. No. 895,174, filed Apr. 10, 1978 now abandoned.

BACKGROUND OF THE INVENTION

Among the many problems involved in the manufacture of metal cans is the multiple handling and frequent transfer of the cans from one station to another. During such handling and transfer operations, the cans may be handled first as a continuously moving mass of cans at one station, e.g., a washing station, and then reoriented and transferred one by one or in single file fashion away from that station by a conveyor to another station where the cans may again be regrouped and handled again as a moving mass.

This conversion from mass handling to single file handling and vice versa poses many problems including, in particular, the reliability and speed with which the cans can be transposed or converted from mass handling to singular handling, etc. Further, since the operation of all parts of a can line usually have to be fully correlated, a slowdown in the speed of operation of a single instrumentality or section of a can manufacturing line can seriously affect and slow down the entire operation of the overall can producing facility. These problems can be aggravated and magnified when the cans being processed and handled are empty and made of a light weight material such as aluminum. Many of the aforesaid problems are substantially overcome by the instant improved system of handling cans and the like at relatively high speeds.

BRIEF ABSTRACT OF THE INVENTION

The instant invention is concerned with can handling and conveyor systems. More particularly, it is concerned with an improved can or container handling and conveyor system wherein individual and empty cans are first isolated and singled out from a mass or plurality of recirculating cans in a given area of a can plant and then transferred in singular fashion to other areas of the plant. The system includes a series of conveyors that can advantageously support the containers in an upright condition, and these conveyors are arranged to provide a recirculating or closed path of travel for a plurality of cans. Associated with these conveyors is a moveable, endless and preferably pocketed vacuum belt means selectively disposed across the path of travel of the cans. This belt means operates to selectively and substantially continuously isolate and remove single, individual cans from the mass of recirculating cans without disturbing their upright condition of otherwise adversely affecting the recirculating movements of the main group or mass of cans. The belt means then transfers the isolated cans in single file fashion away from the closed path of travel of the recirculating cans and towards a discharge station preferably located somewhat remote from the recirculating cans in order to avoid can buildups and jams at the point of can discharge or belt release. The cans are singularly funneled at the can discharge station into a further conveyor. This latter conveyor then finally transfers the cans also in single file fashion from the discharge station to a further can handling or treating station and without disturbing the normal upright position of the cans in which they are initially received from the vacuum belt means.

In the instant system, the final discharge conveyor is also so oriented relative both to the recirculating conveyors and pocketed vacuum belt conveyor and vice versa whereby the final discharge conveyor operates to move the cans away from the vacuum conveyor belt pockets in an improved and efficient fashion. The net result is that can buildups, jams and tippage in the area of the discharge station and final discharge conveyor are minimized and substantially avoided.

The instant development constitutes an improvement over various prior art vacuum conveyors as represented, for example, by those shown in U.S. Pat. Nos. 2,639,025; 3,036,581; 3,158,251; 3,285,387; 3,433,375; 3,477,558; 3,592,334; 3,760,453; 3,835,985 and 3,850,096. The instant system also constitutes an improvement over the combined conveyor and takeoff systems disclosed in prior art U.S. Pat. Nos. 2,215,702; 3,604,551; 3,608,698 and 3,734,267 as well as the pocketed endless vacuum timing conveyor belt manufactured and sold under the trademark "CRADLE BELT" by Products Diversification Inc., of N. Hollywood, California.

DETAILED DESCRIPTION

Figure 1:
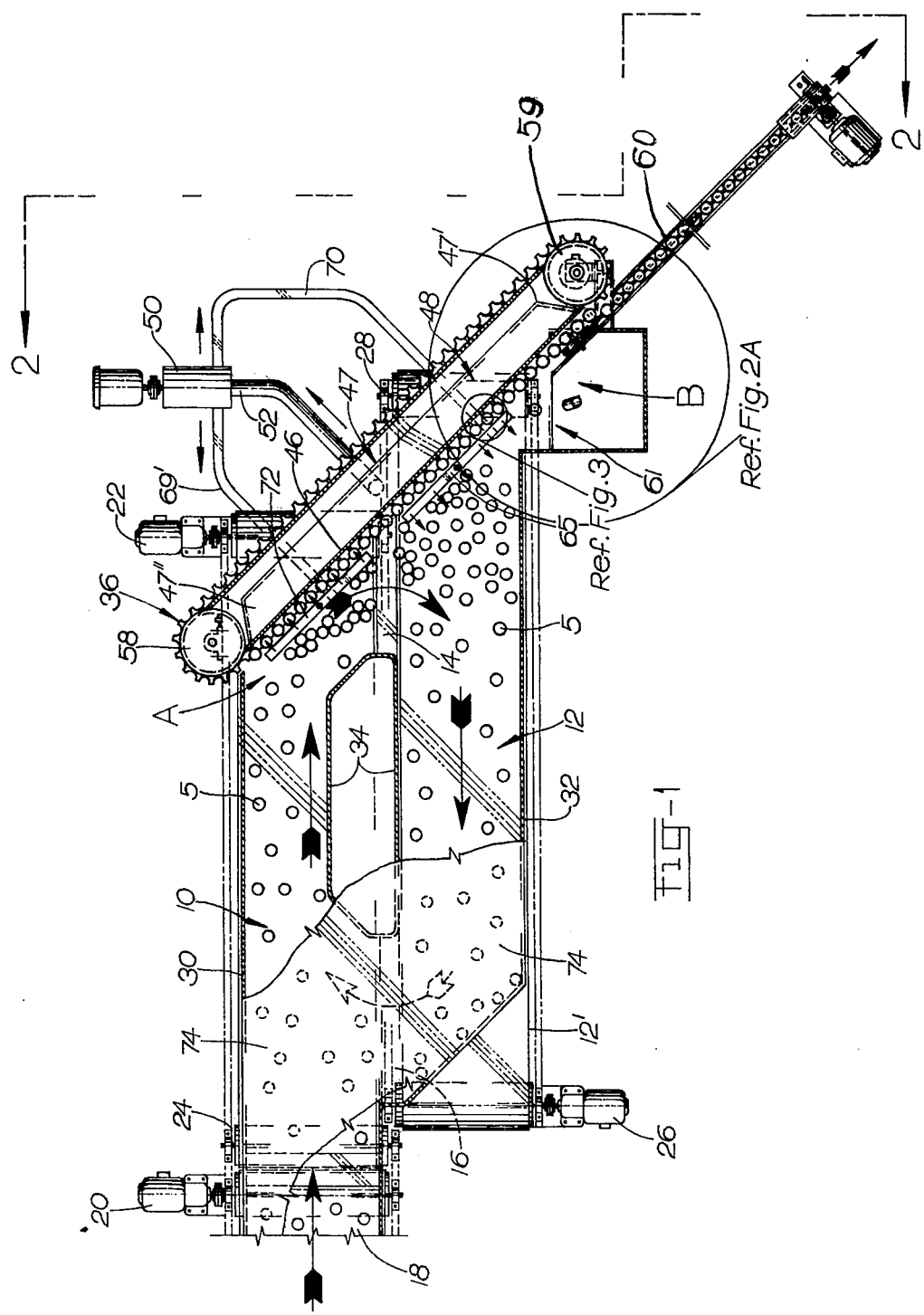
FIG. 1 is an overall plan view of the improved handling system of the instant invention and illustrates the unique arrangement and relationship of the takeoff and pocketed vacuum belt and final discharge conveyor relative to the mass transit closed conveyor system.
Figure 2:
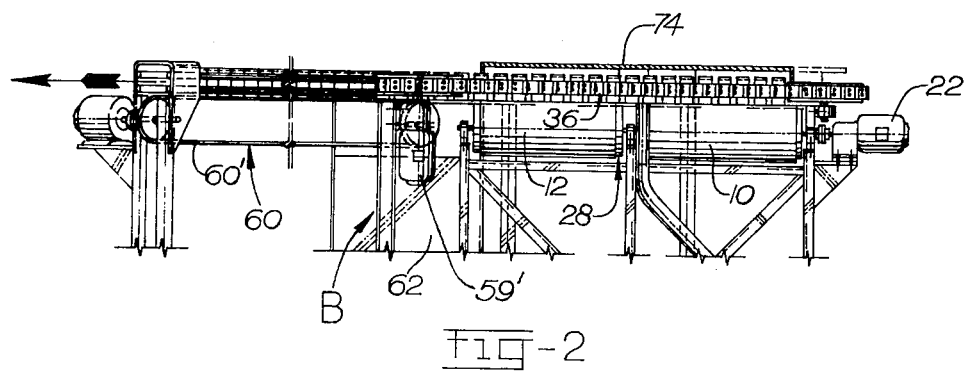
FIG. 2 is an end view generally taken along line 2—2 of FIG. 1 with parts removed.
Figure 2A:
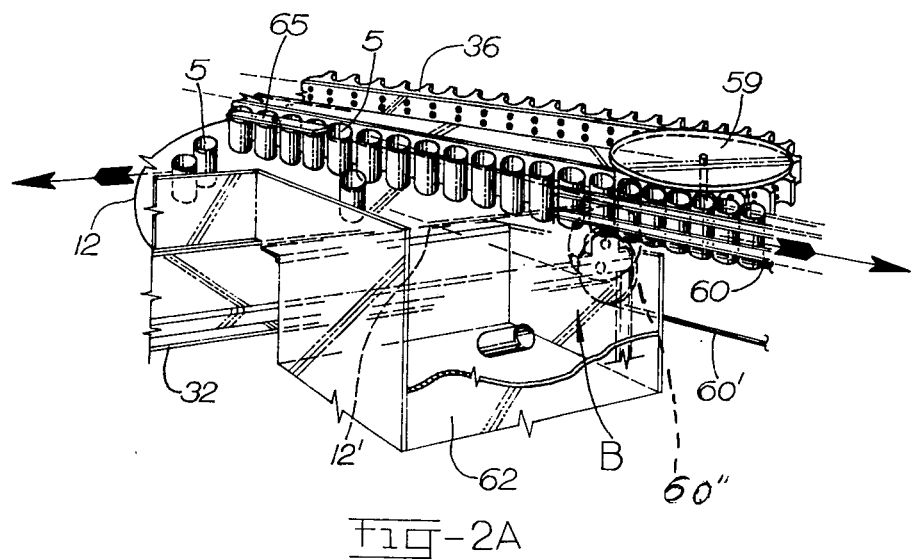
FIG. 2A is a fragmentary perspective view with parts removed of a part of the overall can handling system of the instant invention when taken within the circumscribing circle 2A of FIG. 1.
Figure 3:
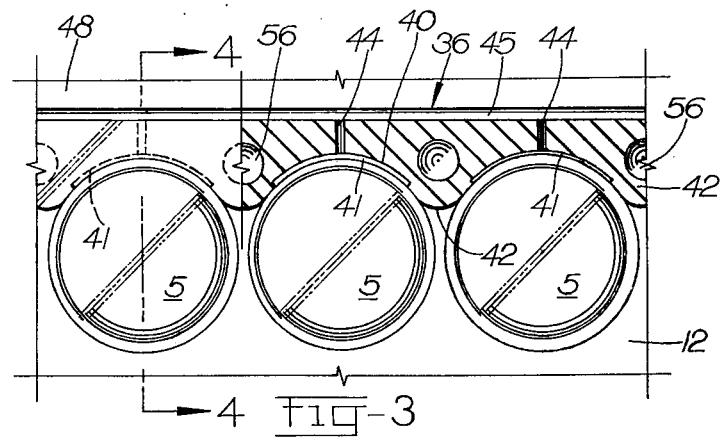
FIG. 3 is an enlarged view taken within the circumscribing circle 3 of FIG. 1 with parts removed.

With further reference to the drawings and, in particular, FIGS. 1 and 2, the improved can handling system is generally comprised of a pair of cooperating endless chain belt conveyors 10 and 12, conveyor 10 acting as a feeding conveyor and conveyor 12 as a return conveyor. These conveyors comprised of tabletop chain and hinged links of the type sold by the Rexnard Company of Milwaukee, Wisconsin under the designation "821 Series Chains" conveyors are interconnected by the flat standard transfer plates 14 and 16 at their respective end portions whereby the conveyors and plates form a closed loop or recirculating path of travel for a plurality of cans 5 that are initially disposed upon the conveyor 10 from a feed conveyor 18 driven by motor 20. Conveyor 10 is driven by the usual drive mechanism 22 with the other end of the conveyor being located and threaded about the idler roller assembly 24. Conveyor 12 is driven by the drive assembly 26 at one end with the other end of belt 12 then being trained about the usual idler roller 28. The top of belt 12 in the area of plate 14 can be arranged to a fraction of an inch below the top of plate 14 that is level with the top of belt 10 to facilitate the flow of cans 5 from belt 10 to belt 12. Conversely the top of belt 12 in the area of plate 16 can be raised a fraction of an inch above the top of plate 16 that is level with the top of conveyor 10 in order to smooth out the flow of cans from belt 12 to belt 10 in the area of plate 16. Side barrier plates 30 and 32 are disposed adjacent conveyors 10 and 12, and an expanded divider and barrier plate assembly 34 is appropriately mounted between the conveyors intermediate the ends thereof. Plate assembly 34 provides an interior separator for the conveyors and helps define the paths of travel therebetween. It will be observed by reference to FIG. 1 that the expanded divider 34 is somewhat trapezoidal in plan so as to narrow and restrict the path of can flow between divider 34 and barrier 30 at the aft or exit portion of feeder conveyor 10 in the area A. This flow restriction of the cans tends to concentrate and direct the main flow of the containers or cans 5 toward the area of can pickup station A so that they will be more likely to contact rather than bypass the vacuum belted single file conveyor 36 at the forward or entry portion thereof. As indicated, particularly in FIGS. 3 and 4, belt 36 which is preferably pocketed is advantageously made from a flexible molded polyethylene or other suitable material that is cut away to form successive, uniformly spaced and arcuate recessed vacuum pockets 40. If desired, vacuum pockest 40 can have stepped or cutaway sections 41 that are bounded by the side shoulders 42 for engaging and directly contacting the articles to be grasped and handled by the vacuum belt 36.

Figure 4:
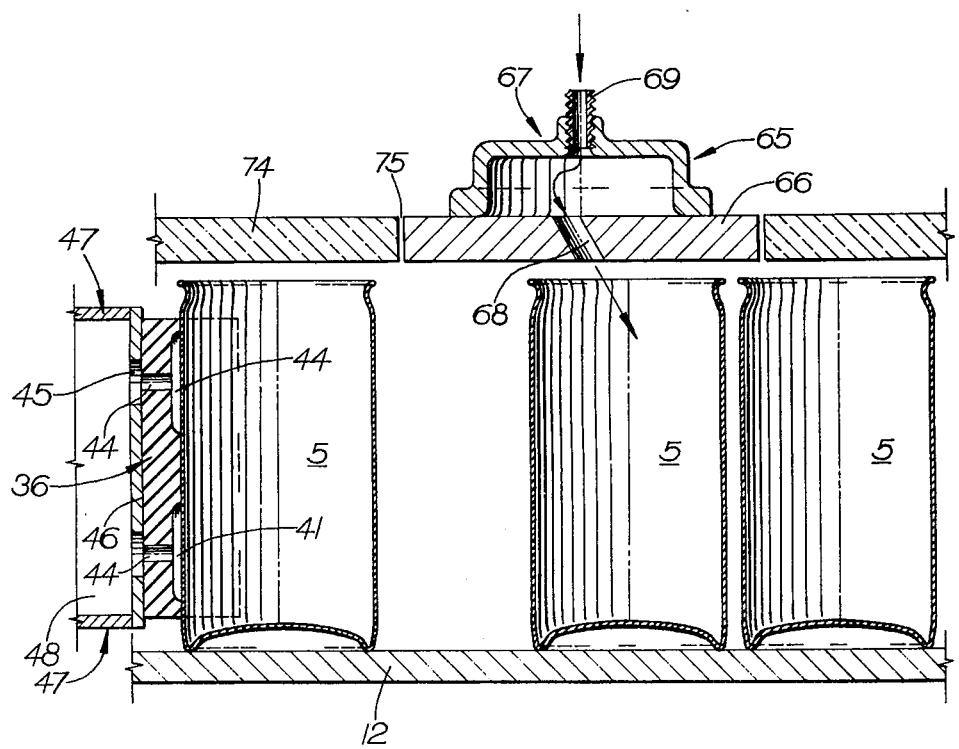
FIG. 4 is a sectional view taken generally along the line 4—4 of FIG. 3 with parts added.

As indicated, particularly in FIG. 4, apertures 44 in belt 36 connect pockets 40 with elongated openings 45 that can run for most of the length of the sidewall 46 of housing 47 containing vacuum chamber 48 that is connected to a vacuum pump assembly 50 by means of the standard piping 52. Chamber 48 located within the overall vacuum housing 47 extends for substantially the full length of the transport flight or vacuum pickup section of vacuum belt 36. The aft end 47" of housing 47 terminates adjacent pickup station A while the forward end 47' of housing 47 terminates adjacent discharge station B. Vacuum belt openings 56 located between the pockets 44 help provide belt 36 with the desired flexibility and bendability for smoothly rounding the corners at high speeds during its return movements in the areas of the pulleys or sheave elements 58 and 59 at least one of which is positively driven in a standard fashion by the drive motor 59'.

Located at discharge station B and preferably remote from or in spaced relation to the edge 12' of conveyor 12 is a takeoff single filer conveyor 60 that can be of the type illustrated in U.S. Pat. No. 3,666,082 wherein the bottoms of the cans 5 are supported and rest on a moving cable. Conveyor 60 includes cable 60' and sheave 60" and the usual side guides, etc.

A drop-off gap or open space 61 advantageously occurs between the conveyors 12 and 60 at discharge station B. The top flight of conveyor 60 is slightly below the level of the top of belt 12 in the area of plate 14 to facilitate movements of the cans onto conveyor 60. Thus, while vacuum belt conveyor 36 successfully bridges and negotiates gap 61 and passes cans 5 across the gap from conveyor 12 to conveyor 60, any tipped over cans 5 will be advantageously urged or pushed off conveyor 12 under the influence of conveyor belt 36 and allowed to fall off conveyor 12 into a collecting bin 62 without disturbing the normal flow of cans off or onto conveyor 10, or onto, off or along conveyor 12 and without causing a jam or deleterious can buildup in the area of discharge station B. In short, the circulatory movements of the cans from and to conveyors 10 and 12 can proceed harmoniously with the operation of takeoff conveyors 36 and 60.

A preferred embodiment of the invention contemplates that belted vacuum conveyor 36 will be arranged crossways and at selected angles to various portions of the paths of travel of the conveyors 10 and 12 to remove cans from these conveyors without disturbing the operations of these conveyors. Thus, as indicated in FIG. 1, the vacuum belt 36 can be arranged in plough fashion and at an acute angle, e.g., a 45° angle relative to the feeding conveyor 10 and at an obtuse angle or a 135° angle relative to the portion of the takeaway or return conveyor 12 that moves the cans away from the belt 36 for return to feeding belt conveyor 10.

Further advantageous embodiments of the invention contemplate that gaseous baffle unit 65, as indicated in FIG. 4, could be used, if desired, to assist in the can takeoff operations of belt 36 by directing a gaseous medium, e.g., air at the appropriate pressure into the open tops of the upright cans in the vicinity of the discharge station B and then down through the cans towards their bottoms. This action will help force the cans 5 not initially collected or isolated by the belt 36 to remain in full bottom contact with conveyor 12 and to continue moving in the closed can loop or circuit for ultimate return to the forward end of the vacuum side of conveyor belt 36. The velocity, psi and volume of air from baffle 65 are all carefully controlled so as to, in effect, seal the cans to belt 12 while avoiding can tippage. Air baffle unit 65, as indicated in FIG. 4, may comprise a plate 66 that forms part of a housing 67 which is suspended over top of the conveyor 12. Plate 66 is provided with a line of suitably disposed holes 68 which are bored at an angle, e.g., a 30-degree angle, for example, in a direction away from the belt 36 and toward conveyor 12 so as to direct the cans toward conveyor 12. Housing 67 is connected to a suitable air source through fitting 69 and piping 70. In an advantageous embodiment of the invention, the air source can comprise the exhaust side of vacuum pump assembly 50 and thereby advantageously provide a closed air circuit while reducing the installation costs of the overall unit.

In a further advantageous embodiment of the invention, the aft part of the feeding conveyor 10 adjacent the area A may be fitted with a further air deflection device or baffle 72 similar in structure to that shown in FIG. 4 and previously described. In this instance, however, the air ports 68 would function somewhat differently in that they would be simply reversed and directed toward the vacuum belt 36 rather than away from the belt as in the case of the previously described air deflector system of FIG. 4. In other words, as the cans 5 on conveyor 10 approach conveyor 36 as the latter moves to the right as viewed in FIG. 1, the air or gas from deflection device 72 will act as an air deflector that tends to propel or urge the cans 5 into the pockets 40 of belt 36.

Figure 3A:
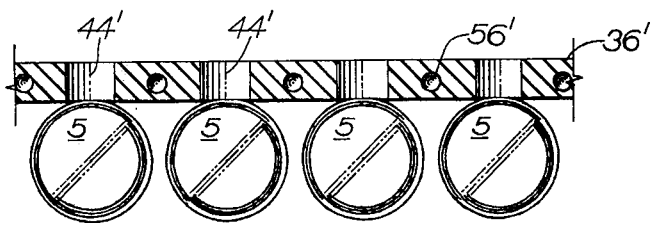
FIG. 3A is a view similar to FIG. 3 showing a modified form of vacuum conveyor belt means.

In lieu of using a pocketed belt 36, the belt as noted in FIG. 3A may be a flat belt 36' while still having air holes 44' and bores 56'. If desired, and as indicated in FIG. 4, the tops of conveyors 10 and 12 and barrier 34 can be covered by a clear plastic cover 74 and holes or elongated slots 75 can then be provided in cover 74 to accommodate air baffle devices 67 and 72. This equipment enclosure by way of cover 74 helps prevent the cans from tipping over and at the same time tends to act as a sound and noise muffling device.

The stepped arrangement noted between various parts of conveyors 10, 12 and 60 enhances the movements of the cans between the conveyors. It is also to be understood that if, for any reason, there is too great a flow of cans from conveyor 18 to conveyor 10, suitable electronic sensing devices such as those manufactured and sold by the Peco Manufacturing Company of Milpitas, California under the designation "Peco Proximity Sensors and Amplifiers" can be used to deactivate the drive for conveyor 18 until the overload of cans from conveyor 18 is alleviated and absorbed by conveyors 10 and 12, etc.

Although not shown, it is to be understood that the instant system will have incorporated therein appropriate gas or air bypasses in the infeed piping to pump assembly 50 to maintain proper air flow through the pump at all times.

An advantageous embodiment of the invention has been shown and described. It is obvious that various changes and modifications may be made therein without departing from the spirit and scope thereof as defined by the appended claims wherein:

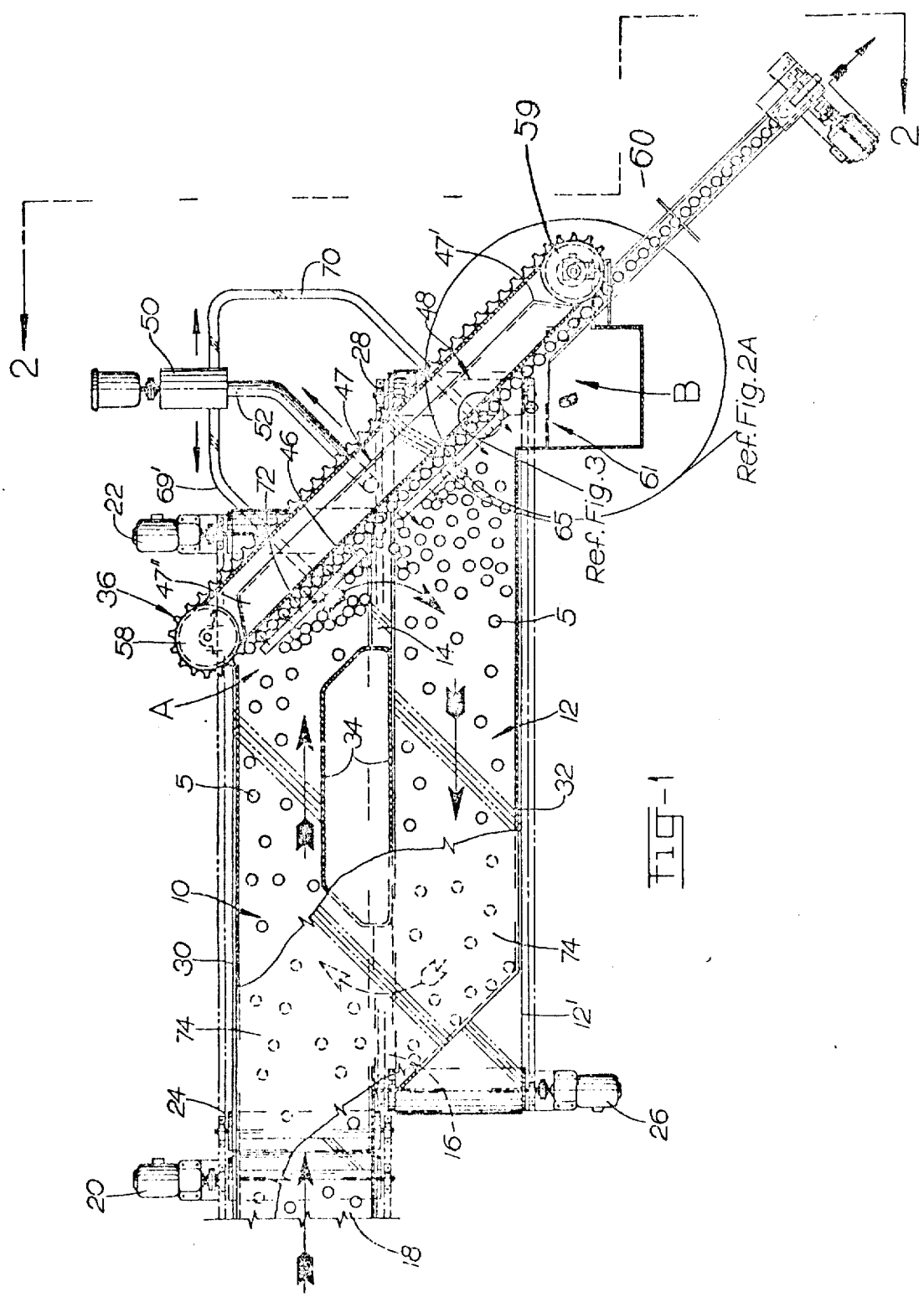

What is claimed is:

1. An article handling system for empty cans and the like, wherein individual cans are first singled out from a mass of moving cans for further handling in a singular fashion and at high speeds comprising the combination of can conveyor means arranged to provide a recirculating and closed path of travel for a plurality of cans, a moveable endless vacuum belt means having a portion thereof arranged in plough fashion at a selected angle across a given portion of the path of travel of the conveyor means that leads toward said vacuum belt means for selectively and substantially continuously singling out individual cans from the mass of moving cans on and removing the singled out cans from the conveyor means without adversely interfering with the normal recirculating movement and flow of said mass of moving cans and for thereafter directly transferring the singled out and removed cans in single file fashion to a can discharge station located in spaced relation to the conveyor means and provided with drop off gap and can collection means for receiving tipped over cans, means for applying a vacuum to the successive can contacting portions of said belt means and for maintaining said vacuum on said can contacting portions of said belt means at least until the same can contacting portions of said vacuum belt means reach the area of the discharge station and a further means for receiving cans from said vacuum belt means at said discharge station and for continuing the single file movement of the cans while moving said cans away from the discharge station.

2. An article handling system as set forth in claim 1, including baffle means associated with said conveyor means for concentrating the flow of the cans on the conveyor means toward the said portion of the endless vacuum belt means.

3. An article handling system as set forth in claim 1, wherein the endless vacuum belt means is arranged crossways and at predetermined and different angles to the various can feeding and return portions of said conveyor means.

4. An article handling system as set forth in claim 3, wherein the endless vacuum belt means is arranged at an acute angle to the normal path of travel of the feeding portion of the conveyor means that advances the cans toward the vacuum belt means.

5. An article handling system as set forth in claim 3, wherein the vacuum belt means is arranged at an obtuse angle to the normal path of travel of the return portion of the conveyor means that moves the cans away from the vacuum belt means.

6. An article handling system as set forth in claim 1, including a baffle means for diverting cans in said mass of moving cans away from the vacuum belt means in the area of said discharge station.

7. An article handling system as set forth in claim 1, including means for initially feeding cans to the conveyor means.

8. An article handling system as set forth in claim 1, wherein said further means for receiving cans from said vacuum belt means comprises a cable conveyor that operates to simultaneously translate and support the cans.

9. An article handling system as set forth in claim 1, including cover means for said conveyor means.

10. An article handling system for empty cans and the like, wherein individual cans are first isolated and singled out from a mass of moving cans for further handling in a singular fashion and at high speeds comprising the combination of can conveyor means arranged to provide a recirculating and closed path of travel for a plurality of cans, a moveable endless vacuum belt means having a portion thereof arranged at a selected angle across a given portion of the path of travel of the conveyor means for selectively and substantially continuously isolating individual cans from the mass of moving cans on the conveyor means without adversely interfering with the normal flow of said mass of moving cans and for thereafter transferring the isolated cans in single file fashion to a can discharge station located in spaced relation to the conveyor means, means for applying a vacuum to the successive can contacting portions of said belt means and for maintaining said vacuum on said can contacting portions at least until the said can contacting portions of said vacuum belt means reach the area of the discharge station, a further means for receiving cans from said vacuum belt means at said discharge station and for continuing the single file movement of the cans while moving said cans away from the discharge station and a gaseous baffle means disposed above the part of the feeding portion of the conveyor means that is located adjacent the forward part of the vacuum pickup section of the belt means that comes into initial contact with the cans so as to direct the cans toward the said forward part of the vacuum pickup section of the belt means.

11. An article handling system for empty cans and the like, wherein individual cans are first singled out from a recirculating mass of moving cans for further handling in a singular fashion comprising the combination of can supporting conveyor means arranged to provide a recirculating and closed path of travel for a plurality of upstanding cans, a moveable endless and pocketed vacuum belt means arranged at selected angles across given portions of the path of travel of the conveyor means that lead to and away from said belt means for selectively and substantially continuously singling out and collecting single cans from the mass of moving cans on the conveyor means without adversely interfering with the normal recirculating movement and flow of said mass of moving cans and for thereafter directly transferring the singled out and collected cans in single file fashion and in an upright condition to a can discharge station located in spaced relation to the conveyor means and provided with drop off gap and can collection means for receiving tipped over cans, means for applying a vacuum to the individual can contacting pocket portions of said belt means and for maintaining said vacuum on the individual pocket portions of said belt means at least until said individual pocket portions of said belt means clear the conveyor means and reach the area of the can discharge station and a further means for receiving cans from the said pocketed vacuum belt means at said can discharge station and for continuing the single file movement of the cans while moving said cans away from the discharge station.

12. The article handling system of claim 11, wherein said pocketed conveyor belt means included stepped portions.

13. The article handling system as set forth in claim 11 including baffle means associated with said conveyor means for concentrating the flow of the cans on the conveyor means toward a selected portion of the endless vacuum belt means located remote from the discharge station and in the area of a can pickup station.

14. The article handling system as set forth in claim 11, wherein the endless vacuum belt means is arranged crossways and at predetermined and different angles to the various feeding and return portions of said conveyor means.

15. The article handling system as set forth in claim 11, wherein the endless vacuum belt means is arranged at an acute angle to the normal path of travel of the feeding portion of the conveyor means that advances the cans towards the endless vacuum belt means.

16. The article handling system as set forth in claim 11, wherein the endless vacuum belt means is arranged at an obtuse angle to the normal path of travel of the return portion of the conveyor means that moves the cans away from the endless vacuum belt means.

17. The article handling system as set forth in claim 11, including cover means for said conveyor means.

18. The article handling system as set forth in claim 11 including means for initially feeding cans in an upright position to said conveyor means.

19. An article handling system for empty cans and the like, wherein individual cans are first isolated and singled out from a recirculating mass of moving cans for further handling in a singular fashion comprising the combination of can supporting conveyor means arranged to provide a recirculating and closed path of travel for a plurality of upstanding cans, a moveable endless and pocketed vacuum belt means arranged at selected angles across given portions of the paths of travel of the conveyor means for selectively and substantially continuously isolating and collecting single cans from the mass of moving cans on the conveyor means without adversely interfering with the normal flow of said mass of moving cans and for thereafter transferring the isolated cans in single file fashion and in an upright condition to a can discharge station located in spaced relation to the conveyor means, means for applying a vacuum to the individual can contacting pocket portions of said belt means and for maintaining said vacuum on the individual pocket portions of said belt means at least until said individual pocket portions reach the area of the can discharge station, a further means for receiving cans from the said pocketed vacuum belt means at said can discharge station and for continuing the single file movement of the cans while moving said cans away from the discharge station and a gaseous baffle means disposed above the part of the feeding portion of the conveyor means that is located adjacent the forward end of the vacuum pickup section of the belt means which comes into initial contact with the cans so as to direct the cans toward the said forward end of the vacuum pickup section of the belt means.

20. An article handling system for empty cans and the like, wherein individual cans are first isolated and singled out from a recirculating mass of moving cans for further handling in a singular fashion comprising the combination of can supporting conveyor means arranged to provide a recirculating and closed path of travel for a plurality of upstanding cans, a moveable endless and pocketed vacuum belt means arranged at selected angles across given portions of the paths of travel of the conveyor means for selectively and substantially continuously isolating and collecting single cans from the mass of moving cans on the conveyor means without adversely interfering with the normal flow of said mass of moving cans and for thereafter transferring the isolated cans in single file fashion and in an upright condition to a can discharge station located in spaced relation to the conveyor means, means for applying a vacuum to the individual can contacting pocket portions of said belt means and for maintaining said vacuum on the individual pocket portions of said belt means at least until said individual pocket portions reach the area of the can discharge station, a futher means for receiving cans from the said pocketed vacuum belt means at said can discharge station and for continuing the single file movement of the cans while moving said cans away from the discharge station, a gaseous baffle means disposed above the part of the feeding portion of the conveyor means that is located adjacent the forward end of the vacuum pickup section of the belt means which comes into initial contact with the cans so as to direct the cans toward the said forward end of the vacuum pickup section of the belt means and means interconnecting the input end of said gaseous baffle means with the exhaust side of the means for drawing a vacuum on the vacuum belt means.

21. The article handling system for empty cans and the like wherein individual cans are first singled out from a recirculating mass of moving cans for further handling in a singular fashion comprising the combination of can supporting conveyor means arranged to provide a recirculating and closed path of travel for a plurality of upstanding cans, a moveable endless and pocketed vacuum belt means extending across and arranged at different selected angles to give portions of the recirculating path of travel of the conveyor means that lead to and away from said belt means for selectively and substantially continuously singling out and collecting single cans from the mass of moving upstanding cans on the conveyor means without adversely interfering with the normal recirculating movement and flow of said mass of moving cans and for thereafter directly transferring the singled out and collected cans in single file and in an upright condition to a can discharge station located in spaced relation to the conveyor means and provided with drop off and can collection means for receiving tipped over cans, means for applying a vacuum to the individual can contacting pocket portions of said belt means and for maintaining said vacuum on said belt means at least until the individual can contacting pocket portions of the belt means clear the conveyor means and reach the area of the discharge station and a cable conveyor means for receiving cans from the said pocketed vacuum belt means at said discharge station and for supporting and continuing the single file movement and upright condition of the cans while moving said cans away from the discharge station.

22. The article handling system of claim 21, wherein the tops of certain portions of the conveyor means are arranged at different levels relative to each other to facilitate the recirculating movement of the cans.

* * * * *

UNITED STATES PATENT AND TRADEMARK OFFICE
CERTIFICATE OF CORRECTION

PATENT NO. : 4,252,232
DATED : February 24, 1981
INVENTOR(S) : LUDWIG BECK ET AL It is certified that error appears in the above—identified patent and that said Letters Patent is hereby corrected as shown below:

In the Drawings

Amend Figure 1 as shown on the attached drawing.

Column 1, line 32, "of" should be --for--
Column 1, line 62, "into" should be --onto--
Column 2, line 24, delete "han-"
Column 2, line 25, "dling" should be --can handling--
Column 2, line 55, "disposed" should be --deposited--
Column 8, line 42, "give" should be --given--

Signed and Sealed this

Twentieth Day of April 1982

[SEAL]

Attest:

GERALD J. MOSSINGHOFF

Attesting Officer     Commissioner of Patents and Trademarks